Jan. 22, 1935.  E. F. MARRESFORD  1,988,744
BISCUIT PANNING MACHINE
Filed Sept. 6, 1933   7 Sheets-Sheet 1

EUGENE F. MARRESFORD
INVENTOR–

BY
Henry Savage
ATTORNEY–

Jan. 22, 1935.  E. F. MARRESFORD  1,988,744
BISCUIT PANNING MACHINE
Filed Sept. 6, 1933    7 Sheets-Sheet 2

EUGENE F. MARRESFORD
INVENTOR.

BY Henry J. Savage
ATTORNEY.

EUGENE F. MARRESFORD
INVENTOR

Jan. 22, 1935.    E. F. MARRESFORD    1,988,744
BISCUIT PANNING MACHINE
Filed Sept. 6, 1933    7 Sheets-Sheet 4
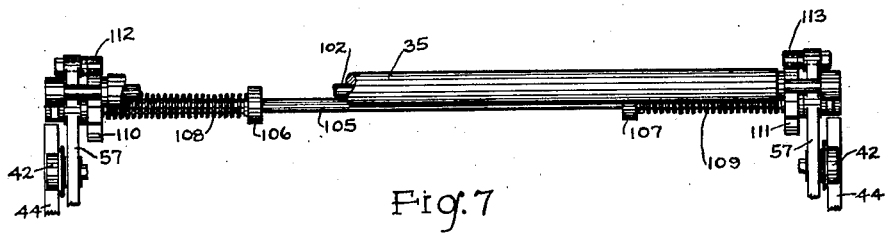
Fig. 7
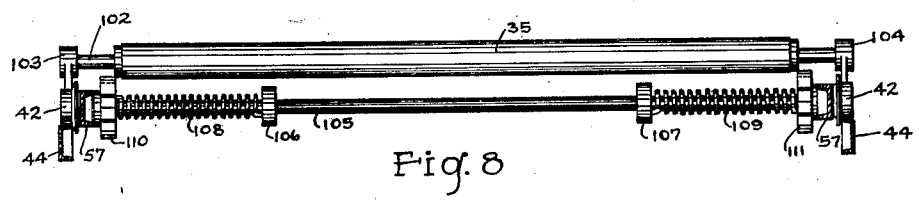
Fig. 8
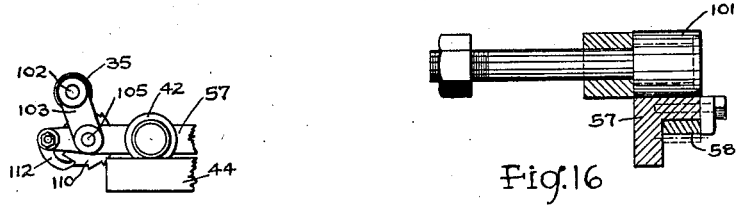
Fig. 9
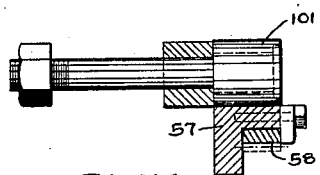
Fig. 16
Fig. 10
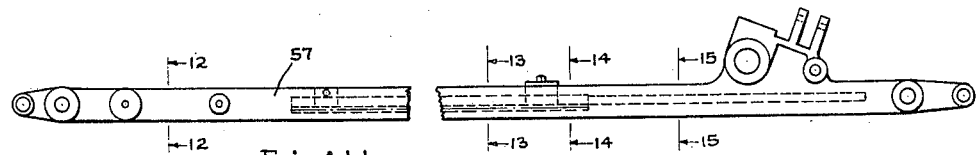
Fig. 11
   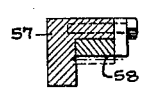   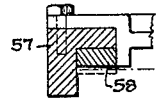   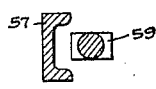
Fig. 12    Fig. 13    Fig. 14    Fig. 15
EUGENE F. MARRESFORD
INVENTOR
BY Henry Savage
ATTORNEY

Fig. 17-A

SPACED AS ON CUTTER APRON - 1½" SKIP 180°

Fig. 18-A

SPACED AS ON CUTTER APRON - 3" SKIP 180°

EUGENE F. MARRESFORD
INVENTOR-

BY Henry J. Savage
ATTORNEY-

Jan. 22, 1935.  E. F. MARRESFORD  1,988,744
BISCUIT PANNING MACHINE
Filed Sept. 6, 1933   7 Sheets-Sheet 6
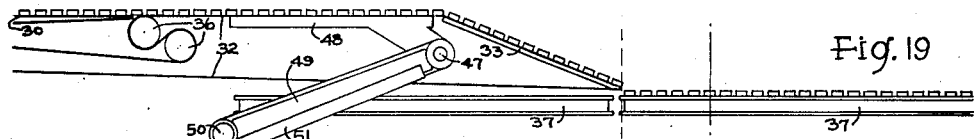
Fig. 19
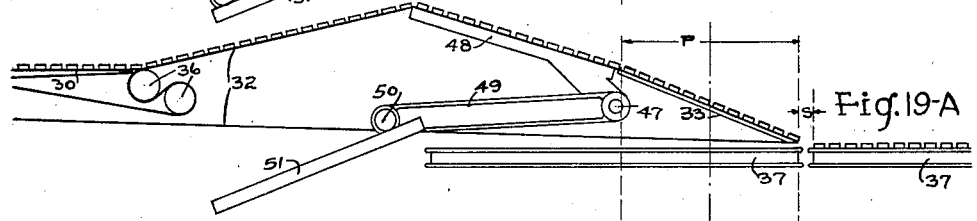
Fig. 19-A
SPACING AS ON CUTTER APRON — 1½" SKIP 180°
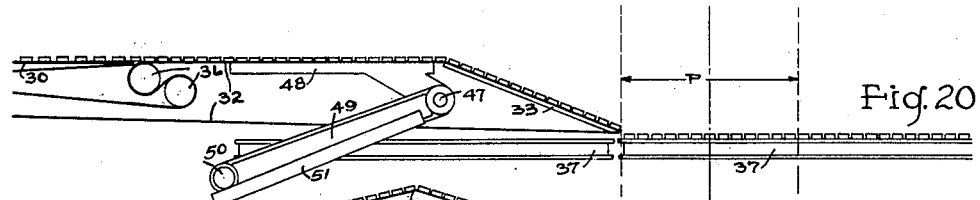
Fig. 20
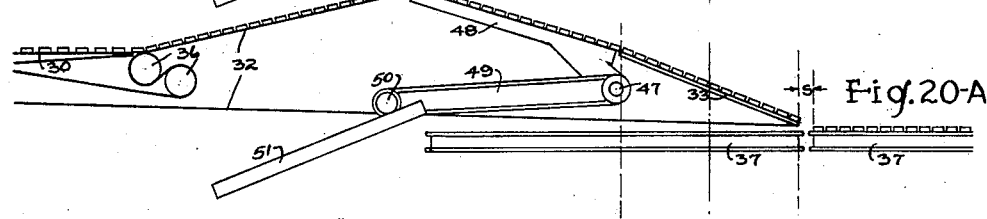
Fig. 20-A
SPACING CLOSED UP — 1½" SKIP 180°
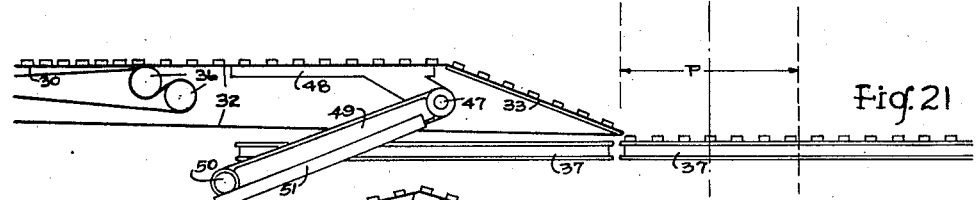
Fig. 21
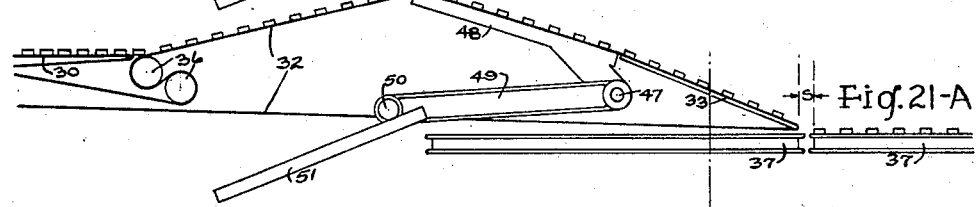
Fig. 21-A
SPACING OPENED UP — 1½" SKIP 180°
EUGENE F. MARRESFORD
INVENTOR-
BY Henry Savage
ATTORNEY-

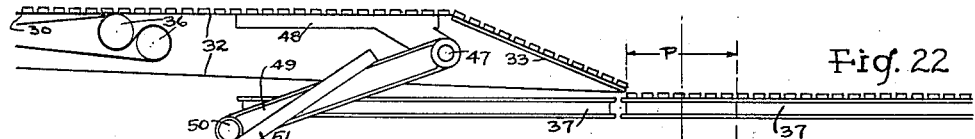
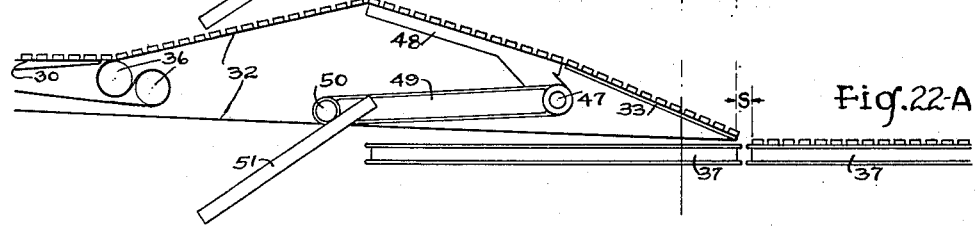
SPACING AS ON CUTTER APRON - 1½" SKIP 120°
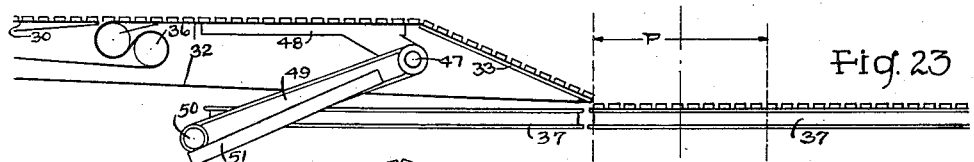
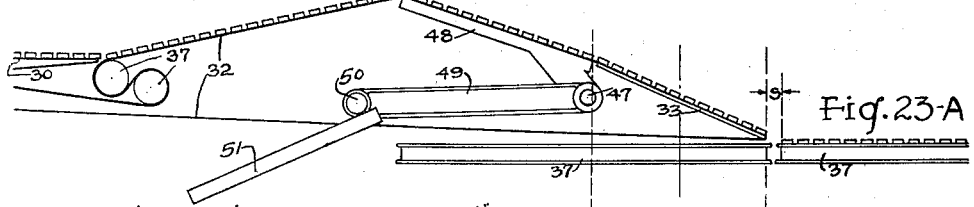
SPACING AS ON CUTTER APRON - 1½" SKIP 180° - FIXED BLADE TRAVEL
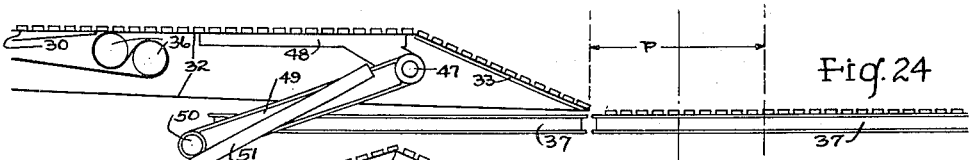
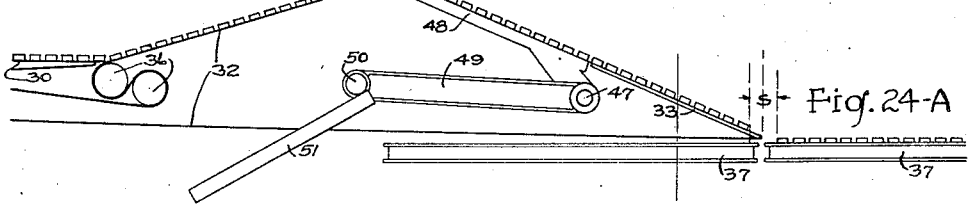
SPACING AS ON CUTTER APRON - 3" SKIP 180° - FIXED BLADE TRAVEL
EUGENE F. MARRESFORD
INVENTOR Patented Jan. 22, 1935

1,988,744

UNITED STATES PATENT OFFICE 1,988,744

BISCUIT PANNING MACHINE

Eugene F. Marresford, New York, N. Y., assignor to National Biscuit Company, New York, N. Y., a corporation of New Jersey Application September 6, 1933, Serial No. 688,350

28 Claims. (Cl. 107—7).

My invention relates to means for delivering articles, received from a cutting, molding or other forming device, in spaced batches or groups to traveling receivers, such as baking pans, drying racks, and the like. I have shown my invention embodied in a biscuit panning machine, but its use is not limited to that art, it being capable of use in many kinds of plastic handling machines, confection making, fruit dryers, etc.

The comparatively recent development of high speed, continuously operating, automatic ovens has made it necessary to improve upon the panning machines heretofore used if the improved ovens are to be used to any where near their capacity. Prior to my invention, the highest development in panning machines was machines of the types exemplified in the patents to Greenhold, 1,905,701 and Green 1,606,166. Machines of these types are very flexible in operation, that is, they are provided with adjustments and mechanism whereby they can pan many different sizes of biscuit with different spacing on pans of various dimensions, but because of the great mass of their moving parts and multiple adjustments, they are not adapted for modern high speed operation. The maximum speed or capacity of these machines is about twenty (20) pans of biscuit per minute. The modern automatic oven should be operable at a speed of thirty or more pans per minute, far beyond the capacity of heretofore existing panning machines. Furthermore, existing machines which have pan carriers or pan feeding chains incorporated therewith can use but one size of pans and those are relatively short, usually less than 30 inches in length. There is necessarily a skip distance of 1½" to 3" between batches on adjacent pans, which is waste space, this percentage increases with shorter pans and decreases with longer pans.

Heretofore in the baking of "sheet goods" such as soda crackers, graham crackers and the like, which are baked in sheets as distinguished from "cut out" or "drop" goods which are spaced apart on the pans, it has been necessary to transfer the sheets of cut dough biscuit by hand peels from the cutting apron to the oven pans. This has been necessary because the panning machines, such as those referred to above, are not adapted to deliver sheets of dough biscuits from the apron to the pans without distortion due either to "stretching" or "buckling" of the dough sheet. This is necessarily so because it is impossible to adjust the machines of the types referred to so that the speed of the apron over the tip of the panner blade is exactly equal to the speed of the traveling pans during the period when biscuit are being deposited, except for a single batch length for each machine. Thus, in a machine of either type referred to above, and as heretofore generally used, it is not possible to construct the machine so that apron speed and pan speed will be equal during the deposit of biscuit except for a single batch length. For example, the machine could be designed to deliver a 28" batch of biscuit on a 30" pan without stretch or buckling, but no other batch length could be so deposited. Such a machine would deliver sheet goods in 28" lengths but no others. This means that only one size or variety of sheet goods could be successfully panned with prior panning machines. Another reason, why sheet goods could not be successfully panned by machines heretofore, is that it is necessary that heat be applied to the biscuit immediately they are panned, that is, they must be panned on to hot pans. This cannot be done with prior machines wherein the pans after being emptied of baked goods are placed in a stack from which they are fed to the pan carrier chain. This permits the pans to cool off before they are re-loaded with another batch of biscuit. The cold pans are then placed in the oven, and if they contain sponge goods, the effect of the leaven will have been dissipated to a great extent or lost before the pans are again heated to a baking temperature. For these reasons, it has been the universal custom to pan all sheet goods by hand.

With prior panning machines, it has been necessary to start them up and then adjust the various submechanisms such as pan speed, skip interval, panner blade travel, apron speed, etc. so as to synchronize all the parts, with the result that many batches of biscuit were lost, in whole or in part, before the machine was properly timed. Furthermore, the machines have to be watched continuously because the parts tend to "creep" and get out of adjustment, so that re-adjustments must be made frequently while the machine is in operation.

Also with prior machines, it is possible to produce the "skip" or space between batches of biscuit only by accelerating the speed of the pans during a part of the cycle. This not only throws a great strain on the mechanism, but also sets up vibrations that limit its speed to a very low maximum. Furthermore, at high speeds of 20 pans or more per minute, the rapid acceleration during the skip will displace the biscuits on the pans.

Having the above objections to existing machines in mind and the requirements for a high speed universal panning machine, my invention has among its objects to provide a panning machine that can pan dough biscuit, including both sheet and cut out goods, on to continuously moving pans, without accelerating the speed of the pans at any point in their travel.

Another object is to provide a panning machine that will operate at high speeds and can be adjusted so that the speed of deposit of the biscuit on the pans is equal to the pan speed.

Another object is to provide a panning machine that will correctly pan all sizes of biscuit on any practicable length of pans, and which, when changing from one size of biscuit or batch length of biscuit to another, can be adjusted to correctly pan the new size or length before the machine is again started up and secure perfect registry from the beginning.

Another object is to provide a panning machine that has few parts and few adjustments to be made to adapt it to the widest range of depositing of biscuits and the like in batches on spaced pans and the like, and which when adjusted and synchronized with the pan carrier will remain in adjustment and synchronization.

Another object is to provide a panning machine that can properly pan all kinds of biscuit with any desired spacing between adjacent rows of biscuits on continuously moving baking pans without accelerating or retarding the speed of the pans.

Another object is to provide a panning machine adapted to pan all sizes of biscuits with any desired "skip" distance between pans of any given length without changing the travel or length of stroke of the panner blade.

Another object is to provide a panning machine having an auxiliary or transfer apron adapted to receive the biscuits from the cutting apron in properly spaced relation for panning and then transfer the spaced biscuit in groups or batches to moving pans.

Another object is to provide a panning machine that will pan all sizes of biscuit with any desired spacing and any length of skip between batches onto pans of any length.

Still another object of my invention is to provide a panning machine having a single panning blade adapted to deposit biscuits in any desired batch arrangement or spacing directly on the continuously moving pans of an oven conveyor without accelerating or retarding any part of the conveyor.

The above and other objects and advantages that will be apparent to those skilled in this art are attained by the embodiment of my invention shown in the accompanying drawings wherein:

Figs. 7, 8 and 9 show the transfer apron tensioning device.

Figs. 10 and 11 are plan and side elevations respectively of the carriage frame members and adjustable rack.

Figs. 12, 13, 14 and 15 are sectional views on the similarly numbered section lines of Fig. 11.

Fig. 16 is a detail of one of the carriage holddown rollers.

Figs. 17 to 24A show more or less diagrammatically how biscuits may be deposited with any desired spacing on the pans, skip distance, blade stroke and division of cycle and yet have the deposit speed of the apron, under all conditions, equal to the pan speed.

Figure 1:
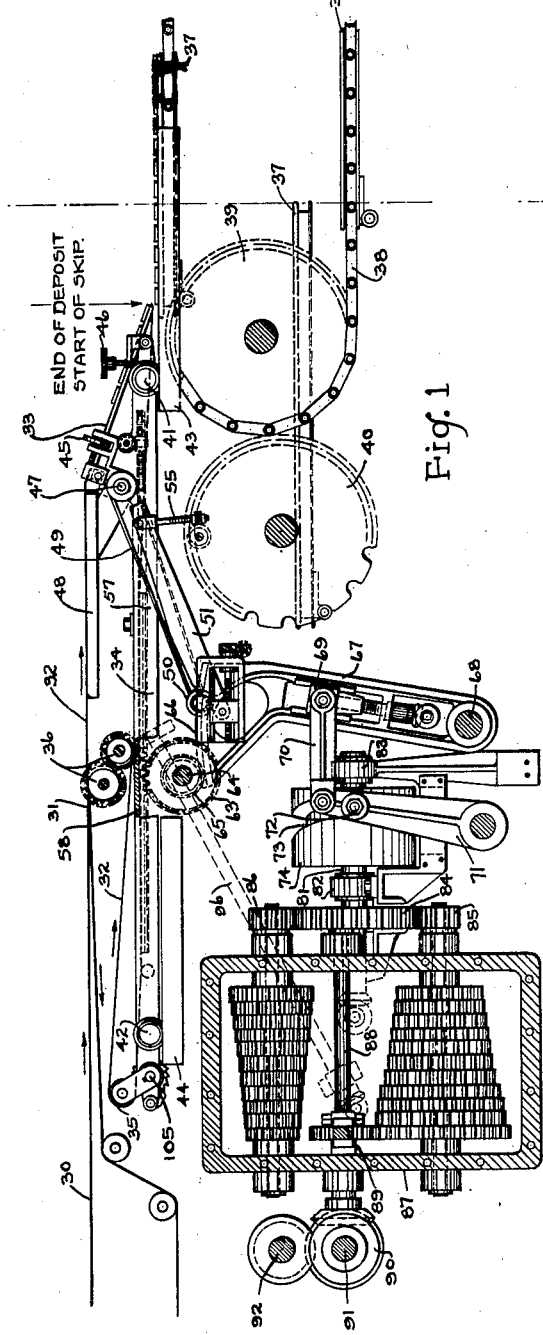
Fig. 1 is a sectional view of the panning mechanism showing the relative positions of the parts when the panner blade is at the end of its rearward or depositing stroke.
Figure 2:
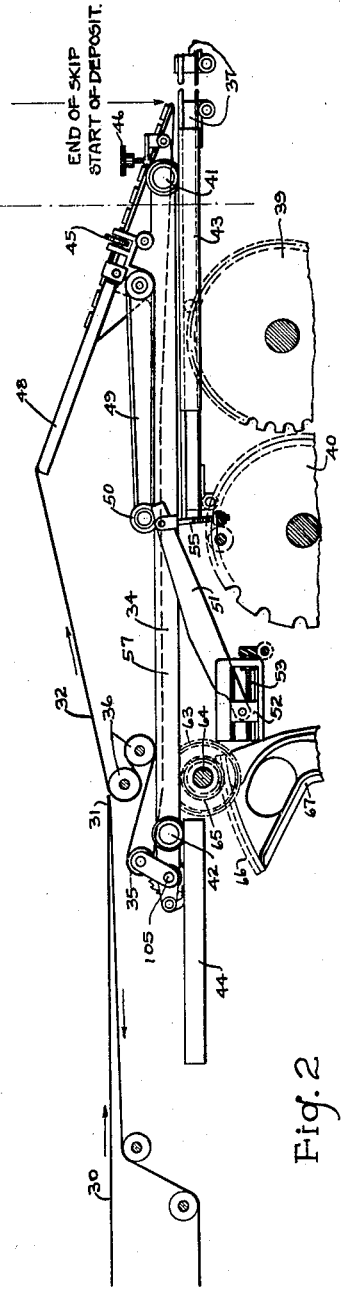
Fig. 2 is a similar view showing the blade at the end of its forward or skip stroke.

Referring first to Figs. 1 and 2, 30 indicates the apron of the biscuit cutting machine which at its forward end 31 passes around a thin guide member and delivers the dough biscuits to an intermediate or transfer apron 32, which, at its delivery end passes around a reciprocating panner blade 33 mounted on the forward end of the traveling carriage 34, which at its rear end carries a tension or take up roller 35 about which the lower run of the transfer apron passes to form a loop and is then carried forward around the two driving rollers 36.

The biscuits delivered by the apron 30 to the transfer apron 32 are in turn delivered in spaced batches to a series of baking pans 37 which are carried by a conveyor chain, 38, driven at suitable speed through a baking oven from which the baked goods are discharged at one point in the travel of the chain. On its return the chain passes around end sprockets 39 and guide wheels or spiders 40 to return the pans to the upper position shown in Fig. 1 where they are again loaded with batches of biscuits.

The oven conveyor chain 38, the transfer apron 32 and the cutting apron 30 are all driven at constant or uniform speed; that is, without any acceleration or retardation, although no two speeds need be equal and in order that the biscuit may be deposited on the pans in properly spaced batches, it is necessary that some provisions be made to establish at times a speed differential between the transfer apron and the pan carrier in order that the proper skip or distance between batches of biscuits may be obtained on the pans. The biscuits, of course, cannot be deposited up to the very edges of the pans and there is also necessarily a space between adjacent pans on which biscuits cannot be deposited. This distance between batches on adjacent pans, which comprises the unoccupied space on the ends of two adjacent pans and the distance between the pans, is referred to as the skip.

In devices heretofore used, as in the Green and Greenholt machines above referred to, this differential in speed or skip is obtained by accelerating the speed of the pans for a portion of the cycle. In another machine such as that shown in patent to Copland #787,081, an attempt was made to secure the skip by taking up or increasing the effective length of the upper run of a transfer apron but such a device is impracticable because the speed at which the apron has to be raised to effect this take up is so great that the biscuit will be thrown off the apron unless a retaining apron or some other means is provided to hold them down but this will result in mutilation of the soft dough biscuit. I provide for the skip by reciprocation of the panner blade 33 together with the forward end of the transfer apron and at the same time by taking up a small amount of the transfer apron during the skip interval. By having the skip stroke or forward stroke of the panner blade take place over a considerable portion of the cycle, both the amount of take up and the rate at which it occurs are low so that the biscuit are not displaced on the transfer apron.

Figure 3:
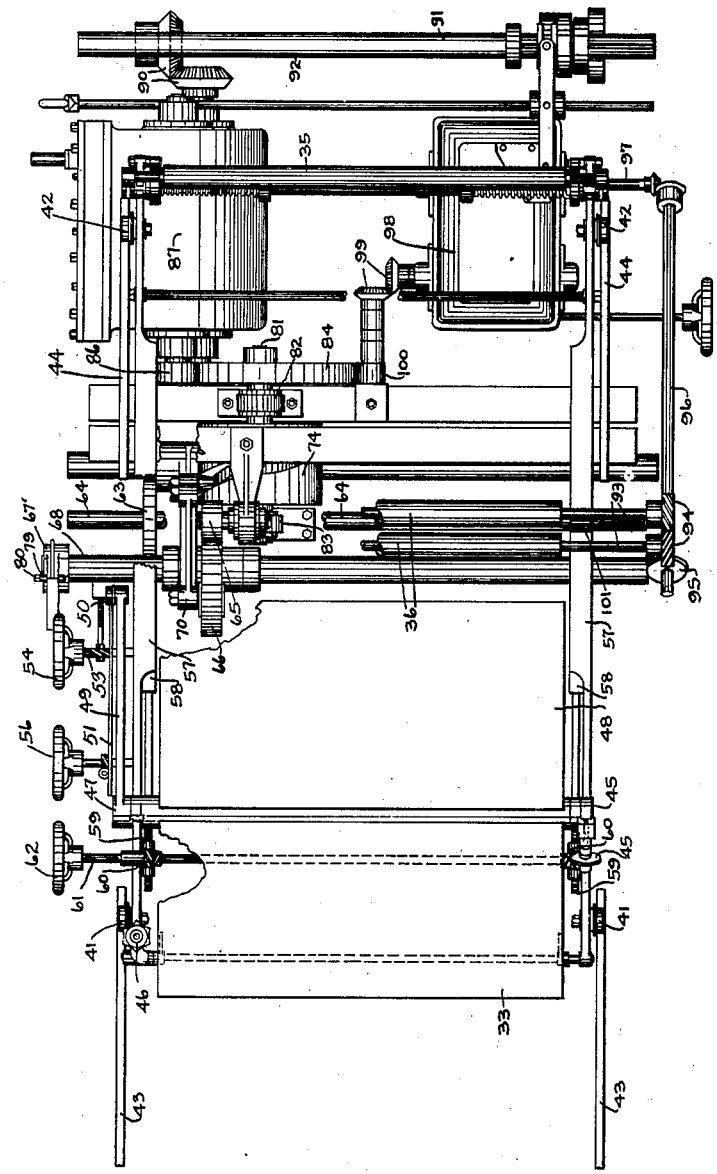
Fig. 3 is a plan view of the machine, the position of the right and left ends being reversed from that of Figs. 1 and 2, and with the aprons omitted to show the parts beneath.

I attain this by the mechanism best shown in Figs. 1, 2 and 3. The carriage 34 is supported on rollers 41, 42 which run upon tracks 43, 44 mounted on the frame of the machine. At its rear end this frame carries the tension roller 35 and at its forward end the panner blade 33 about both of which the transfer apron 32 passes so that when the frame is reciprocating the upper run of the transfer apron is lengthened and shortened and its rate of travel around the edge of the panner blade decreased or increased by the rate of travel of the carriage. The blade 33 is adjustably mounted on the frame, being adjustable fore and aft by means of the adjusting nuts 45. The delivery edge of the blade may also be raised and lowered by means of the hand wheel 46.

A take up arm or lever is also pivotally connected to the carriage at 47, the lever having an arm 48 which contacts with the under side of the upper run of the transfer apron 32 and an arm 49 which carries a roller 50 adapted to ride on a take up cam 51. This take up cam is adjustable so as to vary the amount of take up and to determine its relation to panner blade movement. The lower end of the cam is pivotally connected to a block 52 slidable in the frame of the machine and adjustable by means of the adjusting screw 53 which is operably connected to the hand wheel 54, Fig. 3. The forward end of the cam is pivotally connected to an adjusting screw 55 which in turn is operably connected to hand wheel 56, Fig. 3. By means of these two hand wheels 54, 56 the cam can be shifted both longitudinally and latterly so as to change both the time and extent of take up of the apron 32.

The sliding carriage 34 comprises two similar side frame members, one of which is shown in Figs. 10 to 15, the other being a duplicate thereof except that they are rights and lefts. These frame members 57 carry racks 58 which are adjustable in the frame, each rack being formed with a screw threaded rod 59 at its forward end which engages a nut that is adapted to be rotated by sets of spiral gears 60 secured to opposite ends of the shaft 61 adapted to be rotated by the hand wheel 62 as best shown in Fig. 3. By means of this hand wheel the position of the entire carriage relative to the machine can be adjusted. The racks 58 mesh with gears 63 secured to a shaft 64 which is mounted in bearings on the main frame of the machine. This shaft also carries a pinion 65 meshing with the toothed segment 66 on the upper end of the carriage shifting arm 67. The lower end of this arm is pivotally supported on the frame of the machine at 68 and intermediate its ends has a sliding block 69 which is connected by a link 70 to the cam lever 71 having a roller 72 engaging in the race 73 of the carriage drive cam 74. This cam is driven at such speed that it makes one complete revolution per cycle of the machine, a cycle being that interval during which the panner blade makes two complete strokes, one forward and one return and the pan carrying chain moves the distance between centers of adjacent pans, or the length of a pan plus the gap between pans.

Figure 4:
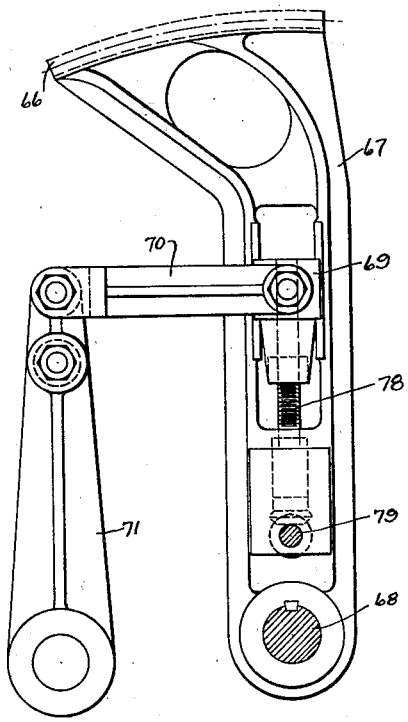
Figs. 4, 5 and 6 are details of the carriage shift arm and graduated head for setting the blade travel.
Figure 5:
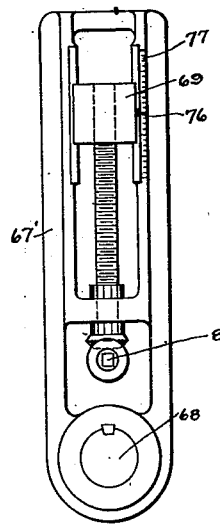
Figure 6:
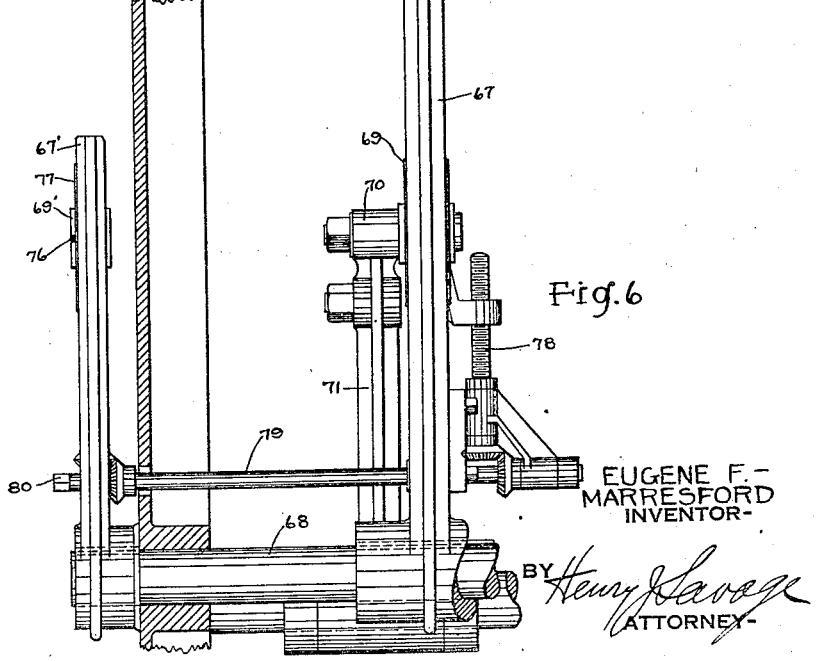

By adjusting the sliding block 69, the throw of the segment arm 67 is changed and consequently the distance that the carriage and panner blade travel is varied. The distance that the panner blade travels or its stroke will vary with each different size of biscuit and skip distance and also with each difference in length of baking pans. Since this stroke and the skip distance above referred to will be constant for any given variety of biscuit, I have provided a means whereby the position of the sliding block 69 can be determined and set to give the proper stroke to the panner blade and carriage before the machine is set in motion. I do this by securing a graduated arm 67' (Figs. 4 to 6) on the outer end of the shaft 68 to which the arm 67 is secured and in it mount a sliding block 69' which occupies the same relative position as the block 69 in the arm 67 and has an indicator 76 which travels along a scale 77 which is graduated for different skip distances and varieties of biscuit. The sliding block 69 is screw threaded and engages a screw 78 which, at its lower end is operatively connected through bevel gears to an adjusting shaft 79 which extends out through the arm 67' where, at its outer end, it is provided with a nut 80 so that it can be adjusted by means of a spanner or other suitable instrument. Before the machine is set in motion, the operator will turn the nut 80 until the indicator 76 coincides with the proper markings on the scale 77 and he will then know that the stroke of the panner blade and carriage is set to properly pan the variety of biscuit that is being baked.

Referring to Figs. 1 and 3, the cam 74 for driving the panner blade and carriage is secured to a short shaft 81 mounted in bearings 82, 83 on the main frame of the machine. The gear 84 fixed to this shaft meshes with a pair of pinions 85, 86 secured to shafts which extend into the change speed gear box 87 so that the cam 74 may be given a wide range of speeds. Each of the shafts in the gear box is provided with a cone of gears and the main drive shaft 88 lies between them. A follower 89 splined to this shaft carries a gear which may be thrown into mesh with any of the gears on either cone. The main drive shaft 88 extends rearwardly through the gear box where it is driven by bevel gears 90 from a shaft 91, which in turn is driven from the shaft 92 which is driven from the same source of power that drives the cutting apron 30.

The rollers 36 for driving the transfer apron 32 are fixed to shafts 93 which carry a pair of spiral gears 94, one of which meshes with and is driven by spiral gear 95 on a shaft 96 which in turn is driven from shaft 97 through a variable speed drive, such as a Reeves drive, housed in the casing 98. This variable speed drive is driven through a pair of bevel gears 99, one of which is driven by pinion 100 meshing with the gear 84 secured to the cam shaft 81.

The variable speed gear 98 and the change speed gear 87 are not shown in all their details because they form no part of the present invention but by their means, or other suitable mechanism, a wide range of speeds can be given to the carriage 34 and to the transfer apron 32 to meet all conditions of operation.

The carriage 34 which comprises the two side frames 57 runs freely upon the tracks 43, 44 and in order that it may not leave these tracks I provide a pair of retaining rollers 101, Fig. 16, which contact with the top side of the frame members above the gears 63 so that the upward thrust of the gears will not throw the carriage off the tracks. One of these rollers is shown in detail in Fig. 16.

Proper tension is maintained on the transfer apron 32 by means of the tension roller 35 (Figs. 7 to 9) which rotates on a shaft 102 fixed at each end to a pair of arms 103, 104, which at their lower ends are fixed to opposite ends of a shaft 105. A pair of collars 106, 107 are fixed to this shaft and each is engaged by one end of a pair of coil springs 108, 109 which at their opposite ends are secured to a pair of ratchets 110, 111 which are rotatably mounted on the shaft 105. The shafts 102 and 105 are rotatably mounted in the frame members 57 and the frame also carries a pair of pawls 112, 113 engaging teeth on the ratchets 110, 111.

By proper adjustment of the ratchets 110, 111 the tension of the springs 108 and 109 can be adjusted to keep the proper tension on the roller 35 and transfer apron 32. This provides a yieldable tension on the apron 32 and permits its upper run to be lengthened as the take up lever 48 is raised, and takes up the slack as the lever recedes.

The cam 74 is driven at such speed that it makes one revolution for each cycle of the machine, a cycle taking place during the movement of each pan 37 past the panner blade. During this cycle, the panner blade 33 makes one complete reciprocation and the take up arm 48 raises and lowers the upper run of the transfer apron 32. The groove or race 73 in the cam 74 may be symmetrical so that the cycle is equally divided between the forward and reverse strokes of the panner blade 33 and take up arm 48 or it may be arranged so that the forward stroke may occupy a longer or shorter period than the return stroke.

In the diagrams, Figs. 17 to 21, the movement of the parts is such as they would be if the cam were symmetrical and the forward and return strokes took place in the same time intervals. With the cycle equally divided in this manner, the amount that the apron 32 has to be taken up by the movement of the arm 48 is equal to ½ of the skip distances between batches on adjacent pans. Thus, if the skip distance is 1½ inches, then the amount that the apron 32 has to be taken up by the rise of the arm 48 will be ¾ of an inch and if the skip distance be 3 inches then the apron will have to be taken up 1½ inches during the forward movement of the panner blade. Similarly, if the cycle be divided so that the forward stroke of the panner blade occupies ⅔ of the cycle, or 240° of the rotation of the cam 74, then the apron 32 will have to be taken up only ⅓ of the skip distance. However, such a division of a cycle usually is not desirable because the return stroke of the panner blade has to be too fast. In practice it has generally been found more satisfactory to divide the cycle substantially equally between the forward and return strokes.

When the machine is to be set in operation, its rate of speed will be determined and limited by the speed at which the pans 37 can be carried through the oven so as to properly bake or dry the product being panned. The speed of the oven chain or pan carrier being thus determined, the speed of the transfer apron 32 and the reciprocations of the panner blade 33 are adjusted so that there is one reciprocation of the blade during the passage of each pan past any given point and the length of travel of the apron 32 will be equal to the length of a batch of biscuits or other products on the pan. Thus, if the pans are say 40" long between centers and it is desired to have a skip of two inches between batches on adjacent pans, then the apron 32 will be adjusted to travel 38 inches during each cycle and the forward stroke of the panner blade will be adjusted so that it will be equal to the travel of the apron minus ½ of the skip. This difference in travel is compensated by the take up arm so that when the blade is moving forward there will be no movement of the apron about the forward edge of the blade and no biscuits will be deposited. The speed of the cutting apron 30 is determined from the speed of the transfer apron 32 and the desired spacing of the biscuits on the pans 37. The speed of deposit of the biscuits from the panner blade on the pans 37 is always equal to the speed of the pans so the biscuits must be spaced on the apron 32 in the relation in which they are to be deposited upon the pans. If the biscuits are to be placed closer together on the pans 37 than they are on the cutting apron 30, then the apron 30 is run at a higher speed than the apron 32 so that the dough biscuits will be spaced closer together on the apron 32 and conversely if the biscuits are to be spaced further apart on the pans 37, then the cutting apron will be run slower than the apron 32 so that there will be an increased space between rows of biscuits. When it is desired to have the biscuits spaced on the pans in exactly the same relation as they are on the cutting apron, the aprons 30 and 32 will be run at the same speed.

While my invention is capable of use with pans of any length or size, it will usually be desirable to have only one length of pans 37 in any oven to which my invention may pan biscuits. With a single length of pan, the only variation that need be made in the stroke of the panner blade will be the slight adjustment necessary to give different skip distances between pans, which of course varies with different sizes and spacing of biscuits. In ordinary practice, a skip distance of 1½ inches is about the minimum and the maximum is about 3 inches.

When the cam 74 is symmetrical so that the cycle is equally divided between forward and reverse strokes, the panner blade will move forward a distance equal to ½ of the pan travel per cycle minus the skip distance. Thus, if the distance between centers of pans is 36 inches and the length of a batch of biscuit on the pan is 34½ inches, which would mean a skip of 1½ inches, then the distance that the blade travels is 36/2−1½ inches or 16½ inches. Since the length of the batch is 34½ inches, the apron 32 during ½ cycle, or during the forward stroke of the panner blade, will have traveled 17¼ inches. Since the blade has traveled only 16½" there would be a run of ¾ of an inch of the apron around the point of the blade except for the action of the take up lever 48 which rides up on the cam 51 so as to take up this ¾ of an inch during the forward stroke of the blade which prevents the apron from passing around the point of the blade and no biscuits are deposited during this forward stroke. This forward stroke begins just as soon as the last row of biscuits has been deposited on a pan and then during this forward movement the skip distance between batches on two adjacent pans must pass under the point of the panner blade. This is accomplished because the pans during this forward stroke of the blade move ½ the pan travel per cycle or 18 inches which is 1½ inches, or the skip distance, greater than the movement of the blade. In other words, during this forward stroke the pans gain the skip distance on the blade. At the end of the forward stroke of the blade, its delivery end will be just over that part of the next succeeding pan where the batch of biscuits is to start. The pans then continue forward at their uniform speed and the blade starts to recede at the same speed at which it was advanced. Now, as the blade recedes, the apron 32 will of course pass around its forward point and the biscuits will be deposited upon the pans and during this rearward stroke, which is of course 16½ inches and takes place in ½ cycle, the apron will be driven by the rollers 36 a distance equal to ½ a batch length or 17¼ inches and the blade receding 16½ inches together with the take up of ¾ of an inch which will be paid out as the take up arm 48 is lowered, will equal another ½ batch length of 17¼ inches, so that by the time the panner blade reaches its rear stroke, 34½ inches of apron, or a length equal to the batch length, will have passed around the point of the panner blade and deposited a batch of biscuits 34½ inches long upon the pans while the pan was moving that same distance relative to the point of the panner blade. Thus the biscuits, whether they be cut out goods or sheet goods may always be deposited upon the pans in the exact relation that they occupied upon the transfer apron.

The forward speed of the carriage 34 and the blade 33 is less than the speed of the transfer apron 32 and the excess of apron travel is taken up by the lever arm 48. It is necessary during this forward stroke of the carriage that there be no forward travel of the apron 32 about the blade 33 because there must be no deposit of biscuit during this part of the cycle. If the take up roller 35 were fixed relative to the blade 33, then the rollers 36 would pull some of the apron along its lower run and over the panner blade during its forward stroke, but the take up roller 35, being yieldably mounted, swings forward in the direction of travel so as to feed additional apron to the driving rollers 36. On the reverse or return stroke, the roller 35 swings rearwardly to take back this excess of apron travel. In other words, the roller 35 moves in the same direction as the carriage but at faster speeds. This differential movement of the roller relative to the carriage is shown in Figs. 1 and 2. In Fig. 1, both the carriage and roller are at their rear positions and in Fig. 2 at the end of their forward movement, the roller 35 having advanced farther than the carriage by the distance it has swung about the shaft 105.

While I have stated that in panning sheet goods, the speed of the transfer apron over the panner blade during deposit is equal to pan speed or travel, this is not necessarily exactly true. All doughs are stretched when rolled and since they possess some elasticity, a sheet of dough biscuits will shrink slightly on being transferred from the apron to a pan. Usually this shrinkage is not more than 1 to 2 per cent of the length of a batch, but a speed differential of this amount is maintained between deposit speed and pan speed to compensate for it. The speed adjustment of the transfer apron 32 permits this to be done to any extent necessary or desired. In fact, with some varieties of biscuit, the sheets will be slightly crowded or compressed on the pans. Of course, when panning cut-out or drop cakes, the speed of the transfer apron during deposit relative to pan speed may vary within wide limits.

In the diagrammatic views, Figs. 17 to 24, I have illustrated several adjustments of the machine for different spacing of biscuits and different skip distances.

Figure 17:
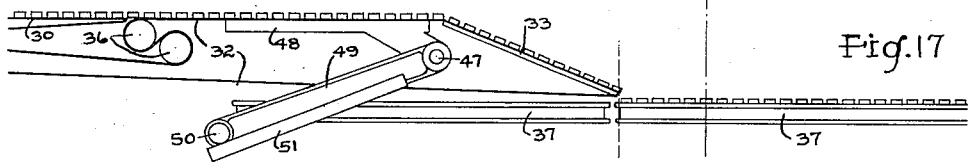
Figure 18:
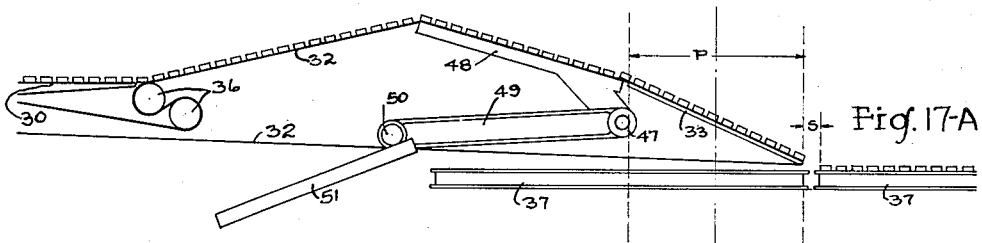
Figure 18:
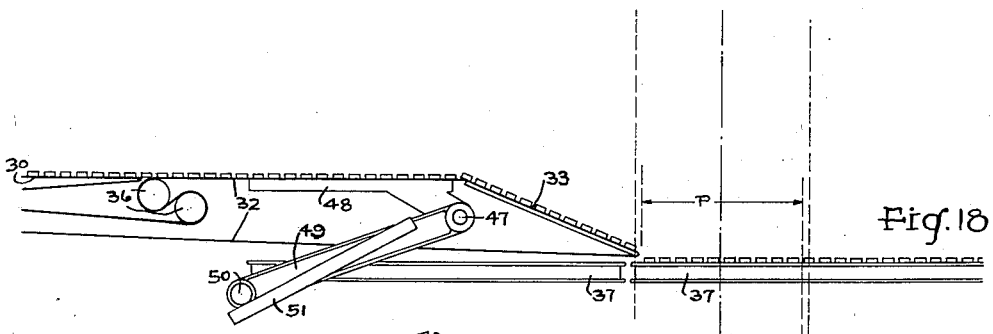

In each of these diagrams the letter P indicates the distance that the panner blade is moved and the letter S indicates the skip distance between batches. These figures are made in pairs, the first figure of each pair representing the position of the parts when the panner blade is at the rear of its stroke or has just finished depositing a batch of biscuits on the pan. The second figure in each instance indicates the position of the parts when the panner blade is at the forward end of its stroke, just about to begin depositing the next batch of biscuits on the next pan. In a machine of this character, a skip of 1½ inches will usually be the minimum distance between batches and a skip of 3 inches is the maximum that will be used except in very exceptional cases. Figs. 17 and 17A show the movements and adjustments of the parts when a skip of 1½ inches is to be attained, the cycle being divided equally between the skip and deposit strokes. Figs. 18 and 18A show the adjustment and movement of the parts when the skip is increased to 3 inches.

Referring first to Figs. 17 and 17A, the distance P which the panner blade moves is equal to ½ of the pan travel per cycle minus the total skip distance S. It is therefore necessary that the inclination of the cam 51 be adjusted so that the take up or rise of the apron 32 will be equal to ½ of the skip distance or ¾ of an inch.

Comparing these figures now with 18 and 18A, it will be noticed that the distance P which the panner blade moves in the last two figures is less than the distance that it moved in Figs. 17 and 17A. Here the distance P in Figs. 18 and 18A is again equal to ½ the pan travel per cycle minus the total skip distance but since the total skip distance here is 3 inches instead of 1½, the blade makes a shorter stroke. In these figures the apron 32 must be taken up ½ of this increased skip distance or 1½ inches so the inclination of the cam 51 has to be increased to give this proper take up. In both of these figures the biscuits are spaced on the pans with the same spacing that they had on the cutting apron 30. This being the case, the speed of the cutting apron is adjusted so that it is equal to the speed of the transfer apron 32.

In the diagrams of Figs. 19 to 21, I have shown how the machine may be adjusted so as to give different spacing of the biscuits on the pans. Figs. 19 and 19A are duplicates of Figs. 17 and 17A in which the skip distance is 1½ inches and the biscuits are deposited on the pans with the same spacing that they had on the cutting apron 30.

In Figs. 20 and 20A the spacing of the biscuits is closed up on the pans, that is, they are closer together than they are on the cutting apron 30. The only thing that is necessary in order to space the biscuits closer together on the pan is to increase the speed of the cutting apron 30 relative to the transfer apron 32 so that the biscuits will be spaced on the transfer apron 32 in the same relative positions that they are to occupy on the baking pan.

In the diagrams of Figs. 21 and 21A I illustrate how the spacing can be opened up. The speed of the cutting apron 30 is made slower than the speed of the transfer apron 32 so that the biscuits are spaced further apart on the apron 32. In all three pairs of these figures, 19 to 21, the same skip distance is maintained and the only adjustment of the machine necessary to produce different spacings is to change the speed of the cutting apron relative to the transfer apron, unless it is also desired to change the skip at the same time.

In the diagrams of Figs. 22 and 22A, I illustrate how the machine will be adjusted and operated when the cycle is divided so that the skip stroke takes place while the cam 74 is rotating through 120 degrees and the deposit stroke occupies 2/3 of the cycle. In these figures the skip distance represented by the letter S is 1½ inches and the distance P which the panner blade moves is equal to 1/3 of the pan travel per cycle minus the skip distance S. The cam 51 therefore must be adjusted so that the take up of the transfer apron 32 is equal to 2/3 of the skip distance and since here the take up must take place in 1/3 of the cycle and it is a greater amount than in the previous figures, the rate of take up and the speed at which the apron rises is much greater than when the cycle is divided equally between the skip and deposit strokes. In these diagrams, of course the deposit stroke is relatively slow since it occurs over 2/3 of the cycle.

In Figs. 23 and 24, I have shown how the machine may operate with a fixed length of stroke of the panner blade. In both of these figures the cycle is divided substantially equal between the skip and deposit strokes but in Figs. 23 and 23A the skip is the minimum of 1½ inches while in Figs. 24 and 24A the skip is the maximum of 3 inches. In these diagrams the movement of the parts in Figs. 23 and 23A is the same as shown in Figs. 17 and 17A. The stroke P of the panner blade is equal to ½ of the pan travel per cycle less the skip distance and the cam 51 is adjusted to give the proper take up to the auxiliary apron. Figs. 24 and 24A show how the machine can be operated so as to increase the skip distance without any adjustment of the panner blade stroke. In these two figures the stroke P of the panner blade is fixed at a distance equal to ½ of the pan travel per cycle minus the minimum skip distance of 1½ inches. In the normal operation of the machine for a 3 inch skip distance, the movement of the panner blade would be ½ the pan travel per cycle less 3 inches but now since we have a fixed stroke of the blade its travel will be ½ of the pan travel per cycle less 1½ inches. The point of the blade then at the end of the skip stroke, instead of being over the point where deposit of the batch should start on the following pan, is 1½ inches in advance of that point. That is, the point of the blade is disposed directly over the space between two adjoining pans. If the deposit were to start now, immediately on the return stroke of the panner blade, the first row of biscuits would fall on the gap between two pans. In order to prevent this, the auxiliary apron 32 is taken up fast enough so that there is a back travel or creep of the apron around the edge of the panner blade. This creep is clearly shown in Fig. 24A where it will be noted that the first row of biscuits which were at the edge of the panner blade in Fig. 24 are now spaced back a distance equal to ½ of the skip distance from the edge of the panner blade. Now, when the panner blade starts on its return or deposit stroke, this extra amount of the auxiliary apron has to run back over the edge of the panner blade before the deposit of any biscuits takes place on the next following pan. While this short length of apron is running around the edge of the blade, the pan 37 of course continues to move forward and is in the proper position to receive the next batch of biscuit when the first row is fed over the edge of the panner blade. When my invention is to be used only when an oven having a single size of pans, it may be constructed with a fixed length of stroke or travel of the carriage and blade. Then, when it is desired to change from one size or spacing of biscuits to another, or to change the skip distance, the only adjustments that are necessary are the speed and take up of the transfer apron.

The conveyor chain 38 that I have referred to as an oven conveyor need not be an oven chain, but may be a pan carrier of any kind driven at uniform speed. The pans 37 may be fixed to the carrier 38, or they may be loose pans that are taken from the carrier by hand or other means and placed in the oven.

It will thus be seen that my invention not only is much simpler in construction and operation than similar devices heretofore used but also that it requires very few adjustments and that all of the adjustments can be made before the machine is set in operation and once made, the machine will continue to operate indefinitely without further adjustments.

While I have shown my invention embodied in a biscuit panning machine, it is of course capable of use in many arts and while I have used terms relating to the baking industry they are to be considered only as illustrative and not as limiting the invention to use in any particular art or with any definite materials.

What I claim as my invention and desire to secure by Letters Patent is:

1. In a machine of the class described, the combination of an endless apron, means for driving said apron continuously, a panner blade over which said apron runs, means for reciprocating said blade and a portion of said apron, the forward stroke of the blade being less than the apron travel during the stroke, and means preventing forward travel of the apron over the blade during said forward stroke.

2. In a machine of the class described, the combination of an endless apron, means for driving the apron at uniform speed, a panner blade about which said apron passes, means for reciprocating said blade, the speed of the forward stroke of the blade in the direction of apron travel being less than the apron speed, and means preventing the excess of apron travel from passing over the blade during said forward stroke.

3. In a machine of the class described, the combination of a continuous apron having upper and lower runs, means for driving said apron continuously, a reciprocating carriage having a panner blade around which the apron passes at one end, the lower run of the apron forming a loop on said carriage, means for reciprocating said carriage and blade, and means for taking up a part of the upper run of said apron during the forward stroke of said carriage and returning it during the reverse stroke.

4. In a machine of the class described, the combination of a continuous apron having upper and lower runs, means for driving said apron continuously, a reciprocating carriage having a panner blade around which the apron passes at one end, the lower run of the apron forming a loop on said carriage, means for reciprocating said carriage and blade, means for taking up a part of the upper run of said apron during the forward stroke of said carriage and returning it during the reverse stroke, and means for varying the amount of said take up.

5. In a machine of the class described, the combination of a continuous apron having upper and lower runs, means for driving said apron continuously, a reciprocating carriage having a panner blade around which the apron passes at one end, the lower run of the apron forming a loop on said carriage, means for reciprocating said carriage and blade, means for taking up a part of the upper run of said apron during the forward stroke of said carriage and returning it during the reverse stroke, and means for adjusting the amplitude of the reciprocations of the carriage and blade.

6. In a machine of the class described, the combination of a continuous apron having upper and lower runs, means for driving said apron continuously, a reciprocating carriage having a panner blade around which the apron passes at one end, the lower run of the apron forming a loop on said carriage, means for reciprocating said carriage and blade, means for taking up a part of the upper run of said apron during the forward stroke of said carriage and returning it during the reverse stroke, means for adjusting the amplitude of the reciprocations of the carriage and blade, and means for adjusting the amount of said take up.

7. In a machine of the class described, an endless apron having upper and lower runs, means for driving said apron continuously, means for advancing one end of said upper run independent of said driving means, and means for taking up a part of said upper run while said end is being advanced.

8. In a panning machine, a continuous biscuit carrying apron, a pan carrier receiving biscuits from said apron in spaced batches, means for driving said apron and pans at uniform speeds, the pan speed exceeding the apron speed, and means whereby the speed of deposit of biscuit from the apron to the pans is equal to the pan speed.

9. In a machine of the class described, a dough feeding apron, a conveyor having a series of pans thereon, a transfer apron receiving biscuits continuously at one end from said apron and delivering them intermittently to the pans at the other end, means for driving said feeding apron, transfer apron and conveyor at uniform speeds, means for reciprocating the delivery end of said transfer apron longitudinally and the upper run intermediate its ends vertically in timed relation to pan travel to deliver the biscuits in spaced batches to the pans.

10. In a panning machine, a transfer apron having upper and lower runs, means for driving said apron, means for reciprocating one end of said apron in the direction of apron travel, and means for reciprocating the upper run of the apron intermediate its ends transversely to the direction of apron travel.

11. In a panning machine, a continuous apron having receiving and delivery ends, means for driving said apron at uniform speed at its receiving end, and means for periodically increasing and decreasing the speed of the delivery end comprising means for reciprocating said receiving end in the line of its travel and means for reciprocating a part of said apron intermediate its ends transversely of its line of travel.

12. In a panning machine, a reciprocating carriage having a panner blade and a take up roll, an endless apron passing over said blade and take up roll, a take up device on said carriage having means to engage the upper run of said apron, a take up cam, and means on said take up device engaging said take up cam to raise the upper run of said apron upon movement of said carriage in one direction and lower it upon movement in the opposite direction.

13. In a panning machine, a reciprocating carriage having a panner blade and a take up roll, an endless apron passing around said blade and take up roll, a take up lever pivoted to said carriage and engaging the upper run of said apron, a take up cam, and means on said lever engaging said cam, whereby the upper run of said apron will be raised and lowered with reciprocations of said carriage.

14. In a panning machine, a reciprocating carriage having a panner blade and a take up roll, an endless apron passing around said blade and take up roll, a take up lever pivoted to said carriage and engaging the upper run of said apron, an inclined take up cam, means for adjusting both the inclination and position of said cam, and means connected to said lever engaging said cam, whereby reciprocations of said carriage will raise and lower said upper run.

15. In a machine of the class described, an endless traveling transfer apron adapted to carry dough biscuits on its upper run, a series of baking pans traveling adjacent one end of said apron and adapted successively to receive batches of biscuits therefrom, the length of a batch of biscuits being less than the length of a pan, means for driving said apron and pans uniformly at the speed ratio of batch length to pan length, and means operative to decrease the effective speed of the apron relative to the pans by a fractional part of the space between batches during a part of the cycle and to increase the effective speed during the remainder of the cycle.

16. In a machine of the class described, a continuous transfer apron having receiving and delivery ends, means for supplying dough biscuits continuously to said receiving end, a conveyor carrying a series of pans adjacent the delivery end and adapted to receive biscuits therefrom, means for driving said apron and conveyor at uniform speeds, means for deliverying said dough biscuits in spaced batches from said transfer apron to the respective pans, said last named means comprising means for bodily reciprocating said delivery end and take up means for the upper run of said transfer apron.

17. In a machine of the class described, a continuous transfer apron having receiving and delivery ends, means for supplying dough biscuits continuously to said receiving end, a conveyor carrying a series of pans adjacent the delivery end and adapted to receive biscuits therefrom, means for driving said apron and conveyor at uniform speeds, a panner blade over which the delivery end of the apron runs, means for moving said blade forwardly and transversely taking up said apron while adjacent pans are passing said delivery end, and for moving said blade rearwardly and returning said apron take up whereby to deposit the biscuits in batches on the pans.

18. In a machine of the class described, a biscuit carrying apron having upper and lower runs, a reciprocating panner blade about which said apron passes at one end, a carrier having spaced pans thereon adapted to receive biscuits in batches from said apron, means for driving said apron and carrier at uniform speeds in the ratio of batch length to pan length, means for reciprocating said panner blade, means for taking up a part of the upper run of said apron, and means for adjusting said reciprocating means and take up means, the amplitude of the reciprocations varying inversely with the take up and directly with the batch length.

19. In a machine of the class described, a biscuit carrying apron having upper and lower runs, a panner blade about which said apron passes at one end, a take up means for raising and lowering said upper run, means for reciprocating said panner blade in cycles, that portion of the cycle employed for the forward stroke of said panner blade being inversely proportional to the raising of the upper run.

20. In a machine of the class described, a biscuit carrying apron having upper and lower runs, a reciprocating panner blade about which said apron passes at one end, a carrier having spaced pans thereon adapted to receive biscuits in batches from said apron, means for driving said apron and carrier at uniform speeds, the speed of the carrier per cycle exceeding the speed of the apron by the skip distance between batches on adjacent pans, means for reciprocating said panner blade in timed relation to pan travel, means for adjusting the strokes of the panner blade and skip distance between batches, and means for taking up the upper run of said apron during the forward stroke of the panner blade, the amount of take up being a fractional part of the skip distance and varying inversely with the time of the forward stroke of the blade.

21. In a machine of the class described, a biscuit carrying apron having upper and lower runs, a reciprocating panner blade about which said apron passes at one end, a carrier having spaced pans thereon adapted to receive biscuits in batches from said apron, means for driving said apron and carrier at uniform speeds, means for reciprocating said panner blade in timed relation to pan travel, and means for taking up the upper run of said apron during the forward stroke of the panner blade, the amount of take up varying inversely with the time of the forward stroke of the blade.

22. A machine of the class described, having in operative relation a cutting apron, a transfer apron, and a pan carrier, means for driving said aprons and carrier at constant speeds, a reciprocating panner blade cooperating with said transfer apron to deliver articles from the apron to pans on the carrier, and means cooperating with said transfer apron to vary its speed relative to said blade and carrier to deposit the articles in batches on successive pans.

23. In a machine of the class described, a continuous cutting apron delivering articles at one end to one end of a continuous transfer apron, a carrier having pans receiving batches of articles from the other end of said transfer apron, means for driving said aprons and carrier at uniform speeds, a reciprocating panner blade cooperating with the delivery end of said transfer apron, other means cooperating with said transfer apron to vary its speed relative to said blade and carrier to deliver said articles in batches, and means for adjusting the speed ratio between said cutting apron and transfer apron.

24. In a machine of the class described, a continuous apron having receiving and delivery ends, means for driving said apron continuously, means for supplying biscuits to the receiving end, means for reciprocating the delivery end, and means for laterally deflecting said apron between said ends to effect an intermittent discharge of biscuits from said delivery end.

25. In a machine of the class described, a continuously driven transfer apron, means for delivering biscuits continuously to one end thereof, a continuously driven conveyor carrying a series of pans adjacent the other end thereof, means for reciprocating said other end longitudinally of said apron travel, and means for raising and lowering said apron intermediate its ends in timed relation to pan travel to effect an intermittent discharge of biscuits to said continuously moving pans.

26. In a machine of the class described, a continuous apron and a pan carrier having pans of fixed length, means for driving said apron and carrier at uniform speeds, a reciprocating panner blade cooperating with said apron to deliver articles from the apron to the pans on the carrier, means for reciprocating said blade a fixed part of the pan length, take up means cooperating with said apron to vary the speed of its delivery end relative to said blade and pans to deposit the articles in batches on successive pans, and means for adjusting said take up means to vary the space between batches.

27. In a machine of the class described, a continuous apron having upper and lower runs, means for driving said apron, a movable carriage having a panner blade, a take up arm and a yieldable take up roll about which said apron passes, means for reciprocating said carriage at less than apron speed, means for moving said take up arm to increase the length of said upper run on movement of said carriage in one direction, said yieldable take up roll taking back said increase on movement of the carriage in the opposite direction.

28. In a machine of the class described, a continuous apron, means for driving said apron, a panner blade and a take up roll about which said apron passes, means for reciprocating said panner blade at less than apron speed, and means for reciprocating said take up roll at a speed greater than blade speed.

EUGENE F. MARRESFORD.